(12) United States Patent
Graham et al.

(10) Patent No.: US 7,395,501 B2
(45) Date of Patent: *Jul. 1, 2008

(54) TECHNIQUES FOR ANNOTATING PORTIONS OF A DOCUMENT RELEVANT TO CONCEPTS OF INTEREST

(75) Inventors: Jamey Graham, San Jose, CA (US); David G. Stork, Portola Valley, CA (US)

(73) Assignee: Ricoh Company, Ltd., Tokyo (JP)

( * ) Notice: Subject to any disclaimer, the term of this patent is extended or adjusted under 35 U.S.C. 154(b) by 282 days.

This patent is subject to a terminal disclaimer.

(21) Appl. No.: 10/214,380

(22) Filed: Aug. 6, 2002

(65) Prior Publication Data

US 2003/0051214 A1 Mar. 13, 2003

Related U.S. Application Data

(60) Continuation of application No. 09/661,184, filed on Sep. 13, 2000, now Pat. No. 6,457,026, which is a division of application No. 08/995,616, filed on Dec. 22, 1997, now abandoned.

(51) Int. Cl.
*G06F 17/00* (2006.01)
(52) U.S. Cl. ............... 715/254; 715/236; 715/253; 705/10
(58) Field of Classification Search ............. 707/3, 707/5; 364/419.19; 395/336; 715/230, 236, 715/254, 273, 700; 705/10
See application file for complete search history.

(56) References Cited

U.S. PATENT DOCUMENTS

| | | | |
|---|---|---|---|
| 4,417,239 A | 11/1983 | Demke et al. | |
| 4,823,303 A | 4/1989 | Terasawa | |
| 5,153,831 A | 10/1992 | Yianilos | |
| 5,297,042 A * | 3/1994 | Morita | 707/5 |
| 5,309,359 A | 5/1994 | Katz et al. | |
| 5,339,391 A | 8/1994 | Wroblewski et al. | |
| 5,349,658 A | 9/1994 | O'Rourke et al. | |
| 5,384,703 A | 1/1995 | Withgott et al. | |

(Continued)

FOREIGN PATENT DOCUMENTS

DE 198 59 180 A1 12/1998

(Continued)

OTHER PUBLICATIONS

Peter E. Hart and Jarney Graham, Query-Free Information Retrieval, Oct. 1997, IEEE Cooperative Information Systems.*

(Continued)

*Primary Examiner*—William L. Bashore
*Assistant Examiner*—Quoc A Tran
(74) *Attorney, Agent, or Firm*—Townsend and Townsend and Crew LLP

(57) ABSTRACT

An automatic reading assistance application for documents available in electronic form. An automatic annotator is provided which finds concepts of interest and keywords. The operation of the annotator is personalizable for a particular user. The annotator is also capable of improving its performance overtime by both automatic and manual feedback. The annotator is usable with any electronic document. Another available feature is a thumbnail image of all or part of a multi-page document wherein a currently displayed section of the document is highlighted in the thumbnail image. Movement of the highlighted area in the thumbnail image is then synchronized with scrolling through the document.

31 Claims, 14 Drawing Sheets

U.S. PATENT DOCUMENTS

| | | | |
|---|---|---|---|
| 5,404,295 A | 4/1995 | Katz et al. | |
| 5,418,948 A | 5/1995 | Turtle | |
| 5,442,795 A | 8/1995 | Levine et al. | |
| 5,479,600 A | 12/1995 | Wroblewski et al. | |
| 5,481,666 A | 1/1996 | Nguyen et al. | |
| 5,530,942 A | 6/1996 | Tzou et al. | |
| 5,546,502 A | 8/1996 | Hart et al. | |
| 5,596,700 A | 1/1997 | Darnell et al. | |
| 5,638,543 A | 6/1997 | Pedersen et al. | |
| 5,680,636 A | 10/1997 | Levine et al. | |
| 5,694,559 A * | 12/1997 | Hobson et al. | 715/705 |
| 5,721,897 A | 2/1998 | Rubinstein | |
| 5,721,902 A | 2/1998 | Schultz | |
| 5,737,599 A | 4/1998 | Rowe et al. | |
| 5,748,805 A | 5/1998 | Withgott et al. | |
| 5,751,283 A | 5/1998 | Smith | |
| D395,297 S | 6/1998 | Cheng et al. | |
| 5,761,655 A | 6/1998 | Hoffman | |
| 5,768,578 A | 6/1998 | Kirk et al. | |
| 5,778,363 A * | 7/1998 | Light | 707/5 |
| 5,778,397 A | 7/1998 | Kupiec et al. | |
| 5,781,785 A | 7/1998 | Rowe et al. | |
| 5,784,616 A | 7/1998 | Horvitz | |
| D398,299 S | 9/1998 | Ballay et al. | |
| 5,806,079 A | 9/1998 | Rivette et al. | |
| D400,195 S | 10/1998 | Utesch | |
| 5,819,301 A | 10/1998 | Rowe et al. | |
| D400,520 S | 11/1998 | Baker et al. | |
| 5,832,474 A | 11/1998 | Lopresti et al. | |
| 5,838,317 A | 11/1998 | Bolnick et al. | |
| 5,838,323 A | 11/1998 | Rose et al. | |
| 5,845,305 A | 12/1998 | Kujiraoka | |
| 5,847,709 A | 12/1998 | Card et al. | |
| 5,857,185 A | 1/1999 | Yamaura | |
| 5,860,074 A | 1/1999 | Rowe et al. | |
| 5,870,770 A | 2/1999 | Wolfe | |
| 5,873,107 A | 2/1999 | Borovoy et al. | |
| 5,933,841 A | 8/1999 | Schumacher et al. | |
| 5,943,679 A | 8/1999 | Niles et al. | |
| 5,946,678 A * | 8/1999 | Aalbersberg | 707/3 |
| 5,950,187 A * | 9/1999 | Tsuda | 707/3 |
| 5,987,454 A | 11/1999 | Hobbs | |
| 6,006,218 A | 12/1999 | Breese et al. | |
| D418,826 S | 1/2000 | Pavely et al. | |
| D419,144 S | 1/2000 | Baker et al. | |
| 6,012,053 A * | 1/2000 | Pant et al. | 707/3 |
| 6,021,403 A | 2/2000 | Horvitz et al. | |
| 6,026,409 A | 2/2000 | Blumenthal | |
| 6,028,601 A | 2/2000 | Machiraju et al. | |
| 6,055,542 A | 4/2000 | Nielsen et al. | |
| D424,036 S | 5/2000 | Arora et al. | |
| D425,039 S | 5/2000 | Shields | |
| D425,497 S | 5/2000 | Eisenberg et al. | |
| 6,057,839 A | 5/2000 | Advani et al. | |
| 6,070,176 A * | 5/2000 | Downs et al. | 715/513 |
| 6,085,202 A | 7/2000 | Rao et al. | |
| 6,094,648 A | 7/2000 | Aalbersberg | |
| 6,101,503 A | 8/2000 | Cooper et al. | |
| 6,131,092 A | 10/2000 | Masand | |
| D435,561 S | 12/2000 | Pettigrew et al. | |
| 6,182,090 B1 | 1/2001 | Peairs | |
| D439,585 S | 3/2001 | Law et al. | |
| 6,222,547 B1 | 4/2001 | Schwuttke et al. | |
| D445,802 S | 7/2001 | Greminger | |
| 6,259,458 B1 | 7/2001 | Theisen et al. | |
| 6,275,229 B1 | 8/2001 | Weiner et al. | |
| D449,050 S | 10/2001 | Graham | |
| 6,326,957 B1 | 12/2001 | Nathan et al. | |
| 6,335,730 B1 | 1/2002 | Gould | |
| 6,339,437 B1 | 1/2002 | Nielsen | |
| 6,369,811 B1 | 4/2002 | Graham et al. | |
| D456,817 S | 5/2002 | Graham | |
| 6,457,026 B1 | 9/2002 | Graham et al. | |
| 6,553,373 B2 | 4/2003 | Boguraev et al. | |
| 6,582,475 B2 | 6/2003 | Graham et al. | |
| 6,681,370 B2 | 1/2004 | Lawrence et al. | |
| 7,228,492 B1 | 6/2007 | Graham | |
| 2002/0065814 A1 | 5/2002 | Okamoto et al. | |
| 2003/0051214 A1 | 3/2003 | Graham et al. | |
| 2004/0059708 A1 | 3/2004 | Dean et al. | |

FOREIGN PATENT DOCUMENTS

| | | |
|---|---|---|
| EP | 378 848 A2 | 7/1990 |
| EP | 459 174 A2 | 12/1991 |
| EP | 737 927 A2 | 10/1996 |
| EP | 762 297 A2 | 3/1997 |
| EP | 802 492 A1 | 10/1997 |
| GB | 2 137 788 A | 10/1984 |
| GB | 2 156 118 A | 10/1985 |
| GB | 2 234 609 A | 2/1991 |
| GB | 2 290 898 A | 1/1996 |
| GB | 2 332 544 A | 6/1999 |
| JP | 02-001057 | 1/1990 |
| JP | 05-081327 | 4/1993 |
| JP | 07-146872 | 6/1995 |
| JP | 08-255163 | 10/1996 |
| JP | 8-297677 A | 11/1996 |
| JP | 11-213011 | 8/1999 |
| WO | WO 97/12328 A1 | 4/1997 |

OTHER PUBLICATIONS

Gianni Amati, A Framework for Filtering News and Managing Distributed Data, Aug. 28, 1997, Journal of Universal Computer Science, vol. 3, No. 8, pp. 1007-1021.*

Communication mailed Aug. 21, 2007, received from the Japanese Patent Office in Japanese Application 2006-012042.

Adobe Acrobat Reader 3.0 screen dumps (fig. 1-3), (1996).

Adobe Systems, Inc. "Adobe Photoshop 4.0 User Guide for Macintosh and Windows," 1996, Title Page, Copyright Page, Chap. 2, pp. 30-31.

Apple Macintosh system 7 reference manual, pp. 30-31 (1991).

Ball, Thomas, and Eick, Stephen, G., "Software Visualization in the Large," IEEE Computer, vol. 29, No. 4, Apr. 1996, pp. 33-43, http://www.computer.org/computer/co1996/r4033abs.htm.

Begole et al., "Supporting Worker Independence in Collaboration Transparency," doc. ID: ncstrl.vatech_cs/TR-98-12, Virginia Polytechnic Institute and State University (1994).

Begole et al., "Flexible Collaboration Transparency," doc. ID: ncstrl.vatech_/TR-98-11, Virginia Polytechnic Institute and State University (1998).

Boguraev et al., "Salience-Based Content Characterisation of Text Documents," *Proceedings of the ACL/EACL Workshop on Intelligent [Sic] Scalable Text Summarization*, 1997. Topic identification, Discourse-based summarization. pp. 1-12.

Brandow et al., "Automatic Condensation of Electronic Publications by Sentence Selection," *Information Processing and Management*, 31(5):675-685 (1995).

Byrd, D., "A Scrollbar-based Visualization for Document Navigation," doc. ID: xxx.cs.IR/9902028, Computing Research Repository: Information Retrieval (1999).

"Flexible JAMM Screenshots," downloaded from internet site http://simon.cs.ct.edu/-jamm May 4, 2000.

Gliedman, J., "Virtual Office Managers," *Computer Shopper*, 18(9):290 (1998).

Greenberg, et al., "Sharing fisheye views in relaxed-WYSIWIS groupware applications," *Proceedings of Graphics Interface*, Toronto, Canada, May 22-24, 1995, Distributed by Morgan-Kaufmann, pp. 28-38, http://www.cpsc.ucalgary.ca/grouplab/papers/1996/96-Fisheye.GI/gi96 fisheye.html.

Hearst et al., "TileBars: Visualization of Term Distribution Information in Full Text Information Access," *Proceedings of the ACM SIGCHI Conference on Human Factors in Computing Systems*

(*CHI*), Denver, Co., May 1995, pp. 1-8, http://www.acm.org/sigchi/chi95/Electronic/documnts/papers/mah bdy htm.

Hill et al. "Edit Wear and Read Wear," Computer Graphics and Interactive Media Research Group, pp. 3-9, (May 1992).

IBM Technical Disclosure Bulletin, "Quick Selection of Window Environment Coordinates," 35:57-60, ISS # 4B, (1992).

Lam et al. "Automatic document classification based on probabilistic reasoning: model and performance analysis," *IEEE*, 3:2719-2723 (1997).

Langley, P., "An Analysis of Bayesian Classifiers," *Proceedings of 10th National Conference on Artifical Intelligence*, pp. 223-228 (1992).

Langley, P., "Induction of Selective Bayesian Classifiers," *Proceedings of 10th National Conference on Uncertainty in Artifical Intelligence*, pp. 400-406 (1994).

Manber, U., "The Use of Customized Emphasis in Text Visualization," *Proceedings of 1997 IEEE Conf. on Information Visualization*, pp. 132-138, held Aug. 27-29, 1997 in London England.

Schweighofer et al., "The Automatic Generation of Hypertext Links in Legal Documents," *Lecture Notes in Computer* Science, vol. 1134, Wagner et al., eds., from 7th Int. Conf., DEXA 96', held Sep. 1996 in Zurich, Switzerland (1996).

Sumita et al., "Document Structure Extraction for Interactive Document Retrieval Systems," *Proceedings of SIGDOC 93*, pp. 301-310, held Oct. 5-8, 1993 in Kitchner, Ontario.

Taxt, T., "Segmentation of Document Images," *IEEE*, 11(12):1322-1329 (1989).

"c:\. . . \9149920c.wpd—unmodified" Screen Shots of document created in Corel WordPerfect, 4 pages, (Apr. 30, 2002).

Adobe Systems Incorporated, Acrobat Reader, 1999, Adobe Incorporated, Version 4.0.

Balasubramanian, V., *State of the Art Review on Hypermedia Issues And Applications*, chapter 5—Information Retrieval Issues, E-Papyrus, Inc., Apr. 1998 (downloaded from website on Dec. 12, 2004) on the internet: <http://www.e-papyrus.com/hypertext_review.html>.

Combined Search and Examination Report for GB 9827135.6 dated Jan. 27, 1999 (reported out Jan. 28, 1999).

Search Report for GB 9827135.6 dated Jan. 11, 2000.(reported out Jan. 13, 2000).

Office Action for German Patent 198 59 180 dated Nov. 5, 2003.

Shneiderman, B., "Dynamic Queries for Visual Information Seeking," pp. 236-243 from *Readings in Information Visualization, Using Vision to Think*, Card et al., Eds., Morgan Kaufman Publishers, Jan. 25, 1999.

Communication mailed Jul. 24, 2007 from the Japanese Patent Office in Japanese Application 2000-012042.

Pages 40-45 and 164 from *Internet Surfer*, 1997.2, document in Japanese with partial translation.

AdobeAcrobat® 4.0 Classroom in a Book®, second edition, Lesson 10. Creating PDF Documents from Paper and the Web, pp. 1-12, Adobe Press (2000).

* cited by examiner 1006  1002
<RH.ANOH.S NUMBER=4>  1008    1008
We have approached this challenge by introducing an
<RH.ANOH CONCEPT="Intelligent Agents" SUBCONCEPT="intelligent agent" SEN-
TENCE="4" NUMBER=1>intelligent agent </RH.ANOH> that analyzes interactions
between user and<RH.ANOH CONCEPT="Bayes Inference" SUBCONCEPT=" expert system"
SENTENCE="4" NUMBER=3>expert system <RH.ANOH> and automatically constructs
database queries based on this analysis</RH.ANOH.S>. The user is unobtrusively
notified when information relevant to the current diagnostic context has been
returned, and may immediately access it if desired. From the user's perspec-
tive all database machinery is entirely transparent; indeed no formal query
language is even made available. Hence we term this approach query-free infor-
mation retrieval. <p>                                1004
1006
<RH.ANOH.S NUMBER=5> 1002         1008
As we hope will be apparent from what follows, the introduction of the
<RH.ANOH CONCEPT="Intelligent Agents" SUBCONCEPT="intelligent agent" SEN-
TENCE="5" NUMBER=2>intelligent agent </RH.ANOH> additionally offers one solu-
tion to a fundamental problem facing designers of cooperative information
systems: How can legacy systems of substantial complexity be integrated within
a larger system context</RH.ANOH.S>? By requiring that all interactions with
the legacy database be mediated by the agent, we have been able to isolate the
database system cleanly while still supporting query-free information
retrieval. <p>                      1004
1006
<RH.ANOH.S NUMBER=6> 1002         1008
FIXIT is comprised of the three subsystems already mentioned: the probabilistic
<RH.ANOH CONCEPT="Bayes Inference" SUBCONCEPT=" expert system" SENTENCE="6"
NUMBER=4>expert system <RH.ANOH>, the legacy full-text database system (to
which we added a new, semantically-based, indexing structure that supports lim-
ited <RH.ANOH CONCEPT=Natural Language" SUBCONCEPT=" natural language" SEN-
TENCE="6" NUMBER=a>natural language <RH.ANOH> queries), and the <RH.ANOH CON-
CEPT="Intelligent Agents" SUBCONCEPT="intelligent agent" SENTENCE="6" NUM-   1006
BER=3>intelligent agent </RH.ANOH> that effectively integrates
them</RH.ANOH.S>. The following sections describe these system components, pro-
vide implementation details, illustrate the runtime behavior of FIXIT, report
on operational experience, and close with some observations about query-free
information retrieval and the potential for generalizing the underlying para-
digm.<p>   1004                    1008

<h2> FIXIT's System Components</h2>
We first describe the probabilistic expert sub-system and the information
retrieval sub-system. Before briefly describing these, we stress that our pur-
pose was not necessarily to advance the capabilities of the individual compo-
nents or indeed even to exploit fully the best current technology; instead, we
focus on their integration.<p>
<p>

*FIG. 10*

TECHNIQUES FOR ANNOTATING PORTIONS OF A DOCUMENT RELEVANT TO CONCEPTS OF INTEREST

This application is a continuation of and claims priority from U.S. application Ser. No. 09/661,184 filed Sep. 13, 2000 (U.S. Pat. No. 6,457,026) which in turn is a divisional of and claims priority from U.S. application Ser. No. 08/995,616 filed Dec. 22, 1997. The entire disclosures of U.S. application Ser. Nos. 09/661,184 and 08/995,616 are herein incorporated by reference in their entirety for all purposes.

BACKGROUND OF THE INVENTION

The present invention relates to display of electronic documents and more particularly to method and apparatus for augmenting electronic document display with features to enhance the experience of reading an electronic document on a display.

Increasingly, readers of documents are being called upon to assimilate vast quantities of information in a short period of time. To meet the demands placed upon them, readers find they must read documents "horizontally," rather than "vertically," i.e., they must scan, skim, and browse sections of interest in multiple documents rather than read and analyze a single document from beginning to end.

Documents are now more and more available in electronic form. Some documents are available electronically by virtue of their having been locally created using word processing software. Other electronic documents are accessible via the Internet. Yet others may become available in electronic form by virtue of being scanned in, copied, or faxed. See commonly assigned U.S. application Ser. No. 08/754,721, entitled AUTOMATIC AND TRANSPARENT DOCUMENT ARCHIVING, the contents of which are herein incorporated by reference.

However, the mere availability of documents in electronic form does not assist the reader in confronting the challenges of assimilating information quickly. Indeed, many time-challenged readers still prefer paper documents because of their portability and the ease of flipping through pages.

Certain tools exist to take advantage of the electronic form documents to assist harried readers. Tools exist to search for documents both on the Internet and locally. However, once the document is identified and retrieved, further search capabilities are limited to keyword searching. Automatic summarization techniques have also been developed but have limitations in that they are not personalized. They summarize based on general features found in sentences.

What is needed is a document display system that helps the reader find as well as assimilate the information he or she wants more quickly. The document display system should be easily personalizable and flexible as well.

SUMMARY OF THE INVENTION

An automatic reading assistance application for documents in electronic form is provided by virtue of the present invention. In certain embodiments, an automatic annotator is provided which finds concepts of interest and keywords. The operation of the annotator is personalizable for a particular user. The annotator is also capable of improving its performance overtime by both automatic and manual feedback. The annotator is usable with any electronic document. Another available feature is a elongated thumbnail image of all or part of a multi-page document wherein a currently displayed section of the document is emphasized in the elongated thumbnail image. Movement of the emphasized area in the elongated thumbnail image is then synchronized with scrolling through the document.

In accordance with a first aspect of the present invention, a method for annotating an electronically stored document includes steps of: accepting user input indicating user-specific concepts of interest, analyzing the electronic document to identify locations of discussion of the user-specific concepts of interest, and displaying the electronic document with visual indications of the identified locations.

In accordance with a second aspect of the present invention, a method for displaying a multi-page document includes steps of: displaying a elongated thumbnail image of a multi-page document in a first viewing area of a display, displaying a section of the multi-page document in a second viewing area of the display in legible form, emphasizing an area of the elongated thumbnail image corresponding to the section displayed in the second viewing area, accepting user input controlling sliding of the emphasized area through the thumbnail image, and scrolling the displayed section through the second viewing area responsive to the scrolling so that the emphasized area continues to correspond to the displayed section.

A further understanding of the nature and advantages of the inventions herein may be realized by reference to the remaining portions of the specification and the attached drawings.

BRIEF DESCRIPTION OF THE DRAWINGS

FIG. 10 depicts a portion of an HTML document processed in accordance with one embodiment of the present invention.

DESCRIPTION OF SPECIFIC EMBODIMENTS

Computer System Usable for Implementing the Present Invention

Figure 1:
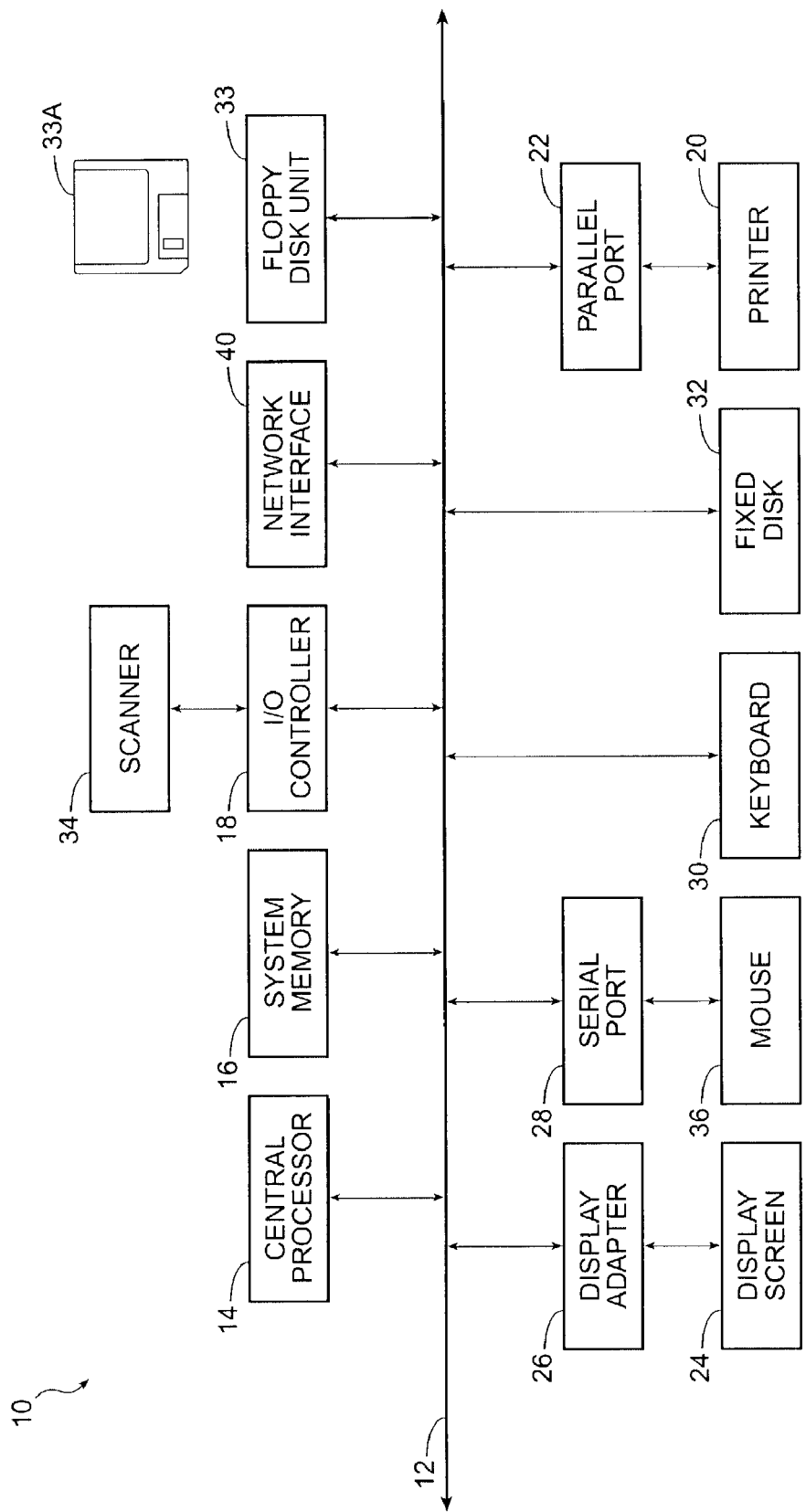
FIG. 1 depicts a representative computer system suitable for implementing the present invention.

FIG. 1 depicts a representative computer system suitable for implementing the present invention. FIG. 1 shows basic subsystems of a computer system 10 suitable for use with the present invention. In FIG. 1, computer system 10 includes a bus 12 which interconnects major subsystems such as a central processor 14, a system memory 16, an input/output controller 18, an external device such as a printer 20 via a parallel port 22, a display screen 24 via a display adapter 26, a serial port 28, a keyboard 30, a fixed disk drive 32 and a floppy disk drive 33 operative to receive a floppy disk 33A. Many other devices may be connected such as a scanner 34 via I/O controller 18, a mouse 36 connected to serial port 28 or a network interface 40. Many other devices or subsystems (not shown) may be connected in a similar manner. Also, it is not necessary for all of the devices shown in FIG. 1 to be present to practice the present invention, as discussed below. The devices and subsystems may be interconnected in different ways from that shown in FIG. 1. The operation of a computer system such as that shown in FIG. 1 is readily known in the art and is not discussed in detail in the present application. Source code to implement the present invention may be operably disposed in system memory 16 or stored on storage media such as a fixed disk 32 or a floppy disk 33A. Image information may be stored on fixed disk 32.

Annotated Document User Interface

Figure 2A:
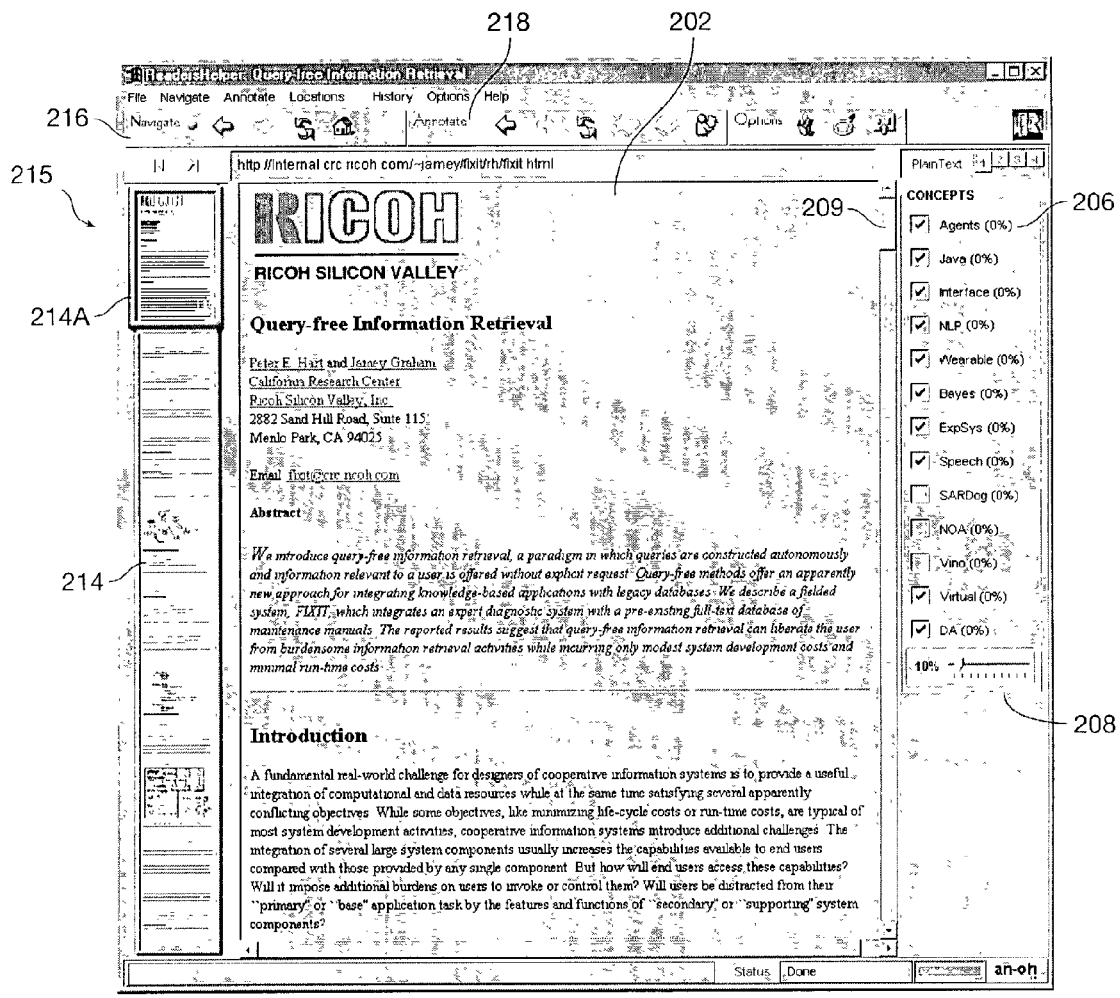
FIGS. 2A-2D depict document browsing displays in accordance with one embodiment of the present invention.

The present invention provides a personalizable system for automatically annotating documents to locate concepts of interest to a particular user. FIG. 2A depicts one user interface 200 for viewing a document that has been annotated in accordance with the present invention. A first viewing area 202 shows a section of an electronic document. Using a scroll bar 204, or in other ways, the user may scroll the displayed section through the electronic document.

A series of concept check boxes 206 permit the user to select which concepts of interest are to be noted in the document. A sensitivity control 208 permits the user to select the degree of sensitivity to apply in identifying potential locations of relevant discussion. At low sensitivity, more locations will be denoted as being relevant, even though some may not be of any actual interest. At high sensitivity, most all denoted locations will in fact be relevant but some other relevant locations may be missed. After each concept name appearing by one of checkboxes 206 appears a percentage giving the relevance of the currently viewed document to the concept. These relevance levels offer a quick assessment of the relevance of the document to the selected concepts. FIG. 2A shows no annotations because a plain text view rather than an annotated view has been selected for first viewing area 202.

A thumbnail view 214 of the entire document is found in a second viewing area 215. Details of thumbnail view 214 will be discussed in greater detail below.

Miscellaneous navigation tools are found on a navigation toolbar 216. Miscellaneous annotation tools are found on an annotation toolbar 218. The annotation tools on annotation toolbar 218 facilitate navigation through a collection of documents.

According to the present invention, annotations may be added to the text displayed in first viewing area 202. The annotations denote text relevant to user-selected concepts. As will be explained further below, an automatic annotation system according to the present invention adds these annotations to any document available in electronic form. The document need not include any special information to assist in locating discussion of concepts of interest.

Figure 2B:
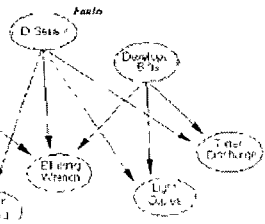

FIG. 2B depicts the document view of FIG. 2A but with annotation added in first viewing area 202. Phrases 220 have been highlighted to indicate that they relate to concepts of interest to the user. The highlighting is preferably color. However, for ease of illustration in black-and-white format, rectangles indicate the highlighted areas of text. For further emphasis, the highlighted text is preferably printed in bold. A rectangular bar 222 indicates a paragraph that has been determined to have relevance above a predetermined threshold or to have more than a threshold number of key phrases. Rectangular bar 222 is merely representative of various forms of marginal annotation that might be used to indicate a relevant section of the text.

Figure 2C:
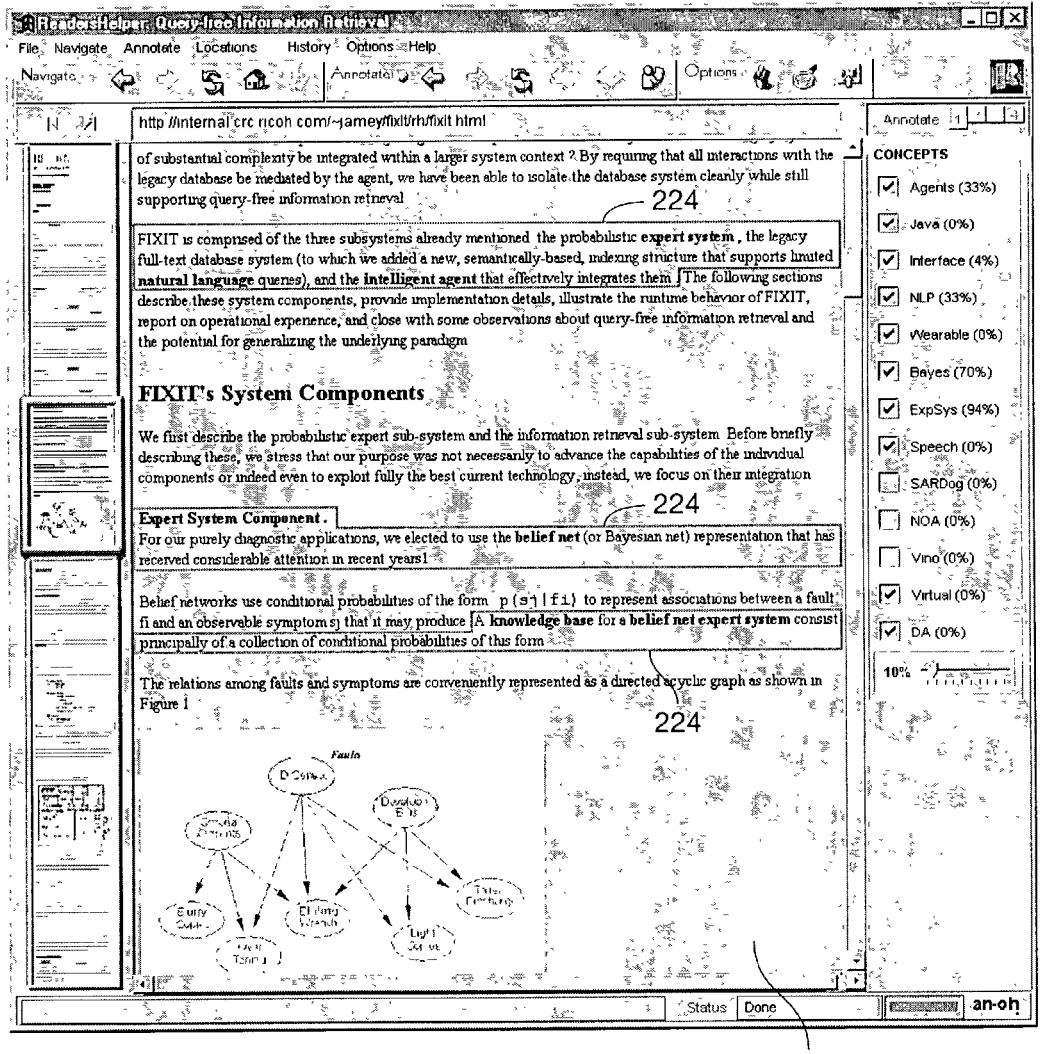

FIG. 2C depicts an alternative style of annotation. Now in first viewing area 202, entire sentences 224 including phrases relevant to concepts of interest are highlighted. The phrases themselves are printed in bold text. It has been found that highlighting the entire sentence rather than just a relevant phrase provides the user with far more information at a glance.

Figure 2D:
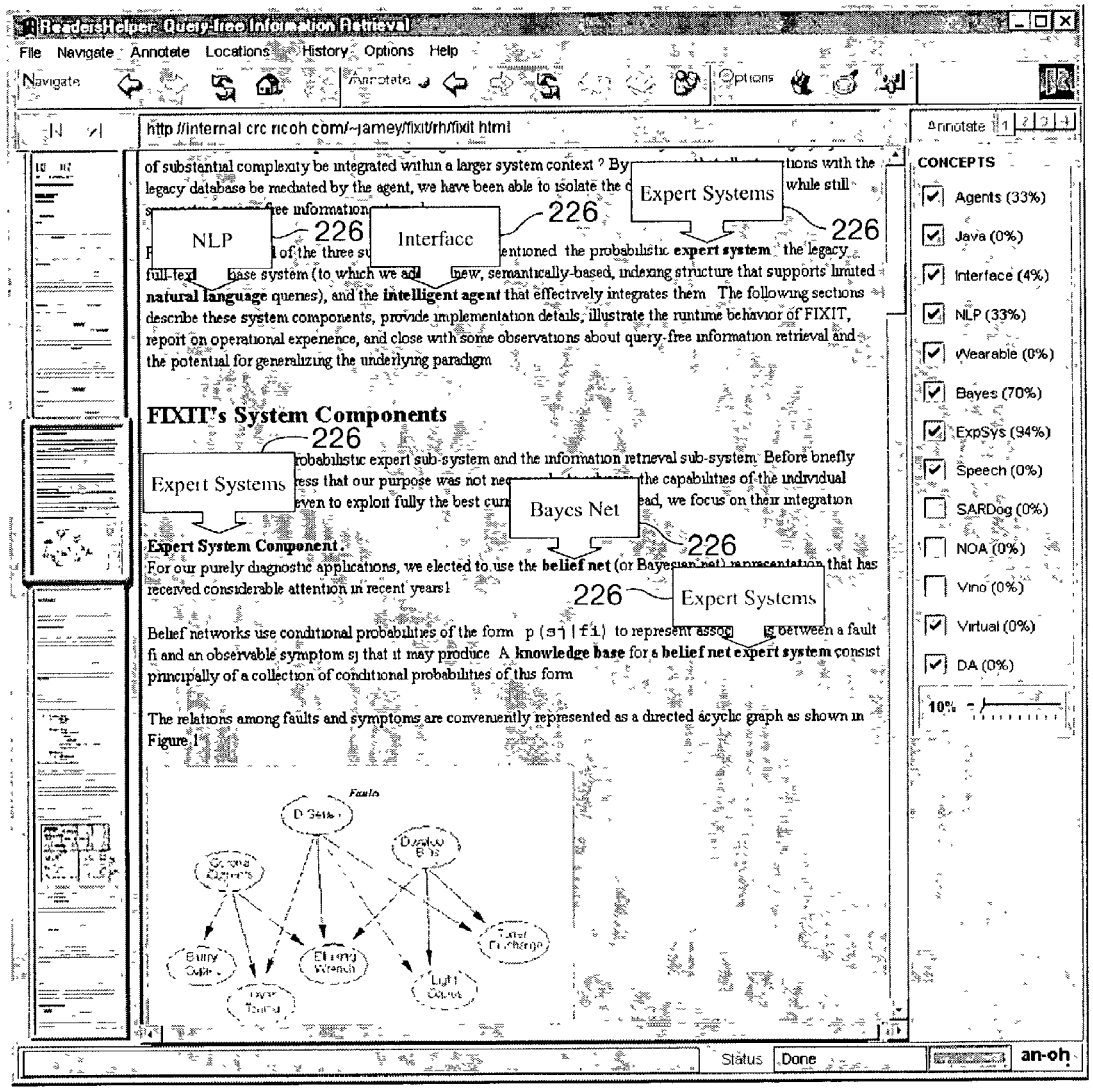

FIG. 2D depicts how further information about key phrases may be displayed. The user may select any highlighted key phrase with the mouse. Upon selection of the key phrase, a balloon 226 appears. The balloon includes further information relevant to the key phrase. For example, the balloon may include the name of the concept to which the keyword is relevant. The balloon may also include bibliographic information if the key phrase includes a citation.

Figure 3:
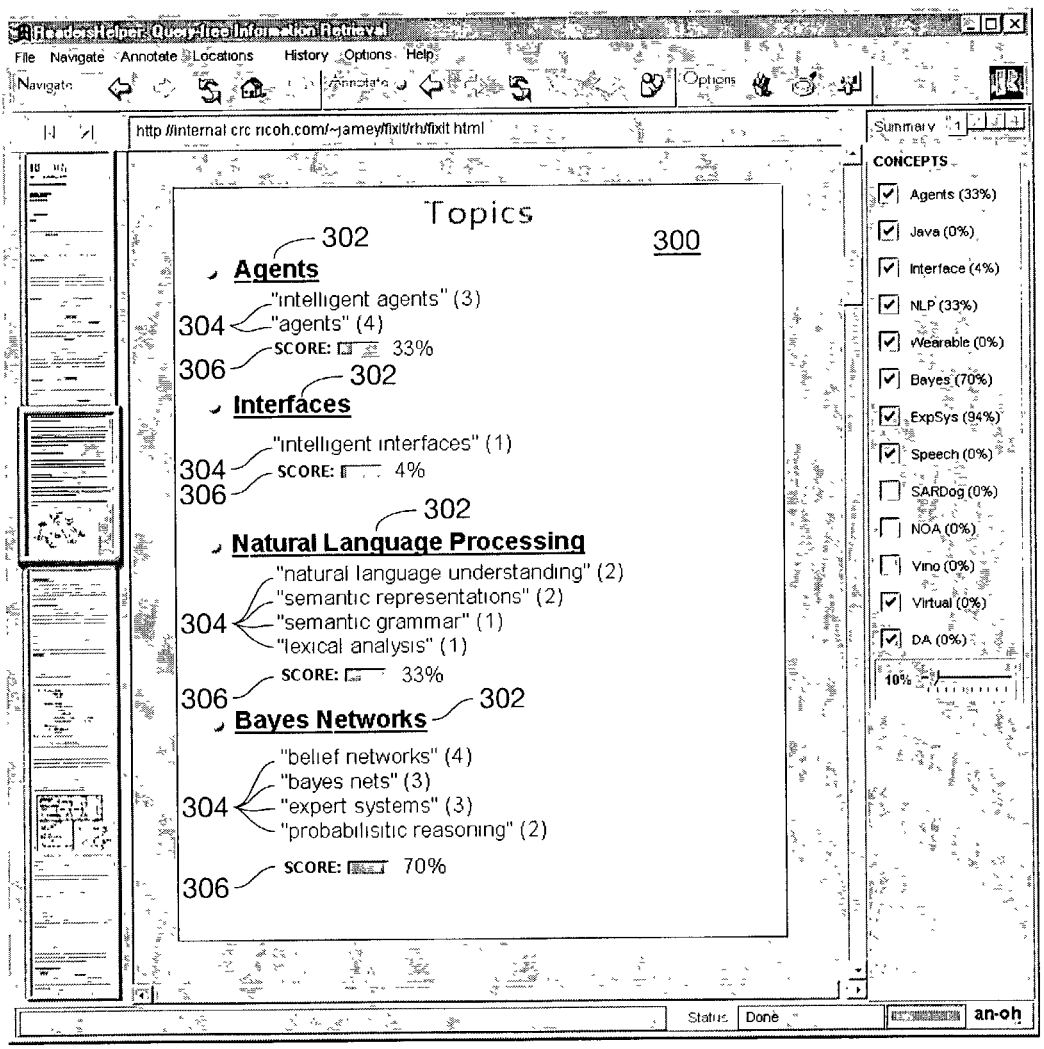
FIG. 3 depicts a document summary view in accordance with one embodiment of the present invention.

FIG. 3 depicts a document summary view in accordance with one embodiment of the present invention. The user may optionally select a summary view 300 of the document. Summary view lists the concepts of interest 302 that are found in the documents as headings of an outline. For each concept, keywords or key phrases 304 are listed which are indicative of the concept of interest. A number in parenthesis by each keyword indicates the number of times the keyword or key phrase appears. Each concept also has an associated score 306 indicative of the relevance of the whole document to the concept.

Figure 4:
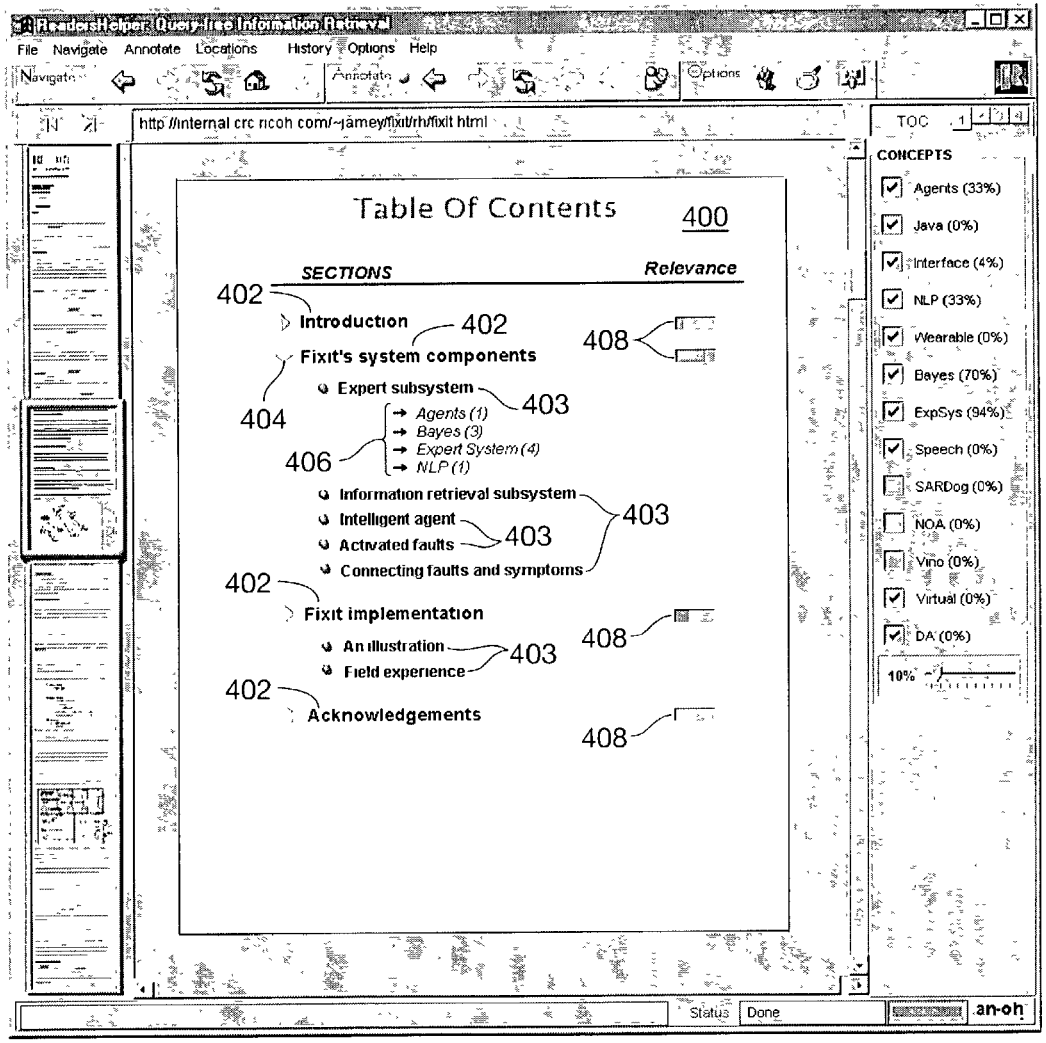
FIG. 4 depicts a table of contents view in accordance with one embodiment of the present invention.

FIG. 4 depicts a table of contents view in accordance with one embodiment of the present invention. An alternative to summary view 300 is a table of contents view 400. Table of contents view 400 lists major headings 402 and subheadings 403 of the electronic document. By selecting one of hierarchical display icons 404, the user may list the concepts 406 found under one of the document headings 402 or subheadings 403 with an indication of relevance for each concept and the number of keywords found. There is also a relevance meter 408 for each document heading 402 that indicates the overall relevance of the text under that heading for all of the currently selected concepts. In a preferred embodiment where the document is an HTML document, to create table-of-contents view 400, the headings of the document are identified by an analysis of the HTML heading tags.

Automatic Annotation Software

Figure 5:
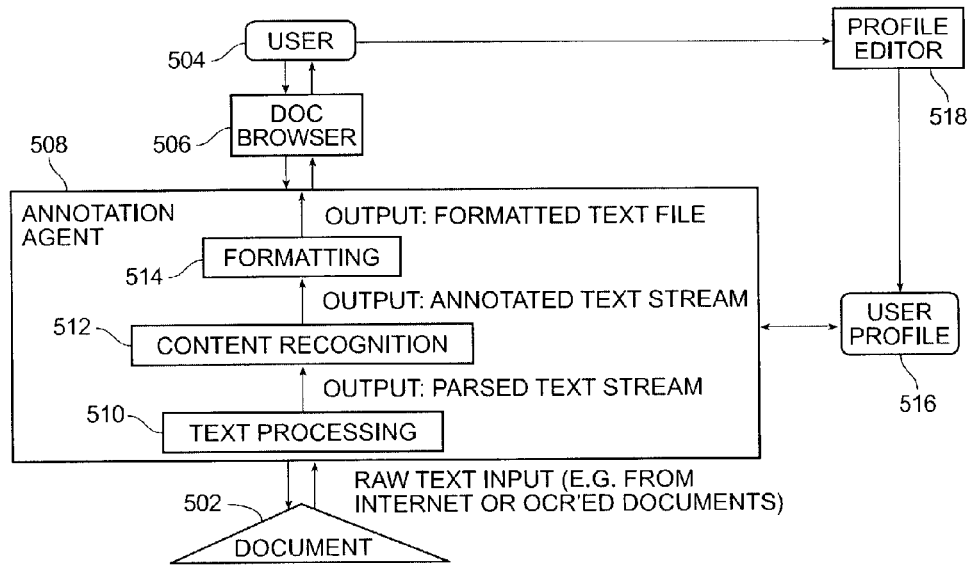
FIG. 5 depicts a top-level software architectural diagram for automatic annotation in accordance with one embodiment of the present invention.

FIG. 5 depicts a top-level software architectural diagram for automatic annotation in accordance with one embodiment of the present invention. A document 502 exists in electronic form. It may have been scanned in originally. It may be, e.g., in HTML, Postscript, LaTeX, other word processing or e-mail formats, etc. The description that follows assumes an HTML format. A user 504 accesses document 502 through a document browser 506 and an annotation agent 508. Document browser 506 is preferably a hypertext browsing program such as Netscape Navigator or Microsoft Explorer but also may be, e.g., a conventional word processing program.

Annotation agent 508 adds the annotations to document 502 to prepare it for viewing by document browser 506. Processing by annotation agent 508 may be understood to be in three stages, a text processing stage 510, a content recognition stage 512, and a formatting stage 514. The input to text processing stage 510 is raw text. The output from text processing stage 510 and input to content recognition stage 512 is a parsed text stream, a text stream with formatting information such as special tags around particular words or phrases removed. The output from content recognition stage 512 and input to formatting stage 514 is an annotated text stream. The output of formatting stage 514 is a formatted text file viewable with document browser 506.

The processing of annotation agent 508 is preferably a run-time process. The annotations are not preferably pre-inserted into the text but are rather generated when user 504 requests document 502 for browsing. Thus, this is preferably a dynamic process. Annotation agent 508 may also, however, operate in the background as a batch process.

The annotation added by annotation agent 508 depends on concepts of interest selected by user 504. User 504 also inputs information used by annotation agent 508 to identify locations of discussion of concepts of interest in document 502. In a preferred embodiment, this information defines the structure of a Bayesian belief network. The concepts of interest and other user-specific information are maintained in a user profile file 516. User 504 employs a profile editor 518 to modify the contents of user profile file 516.

Figure 6A:
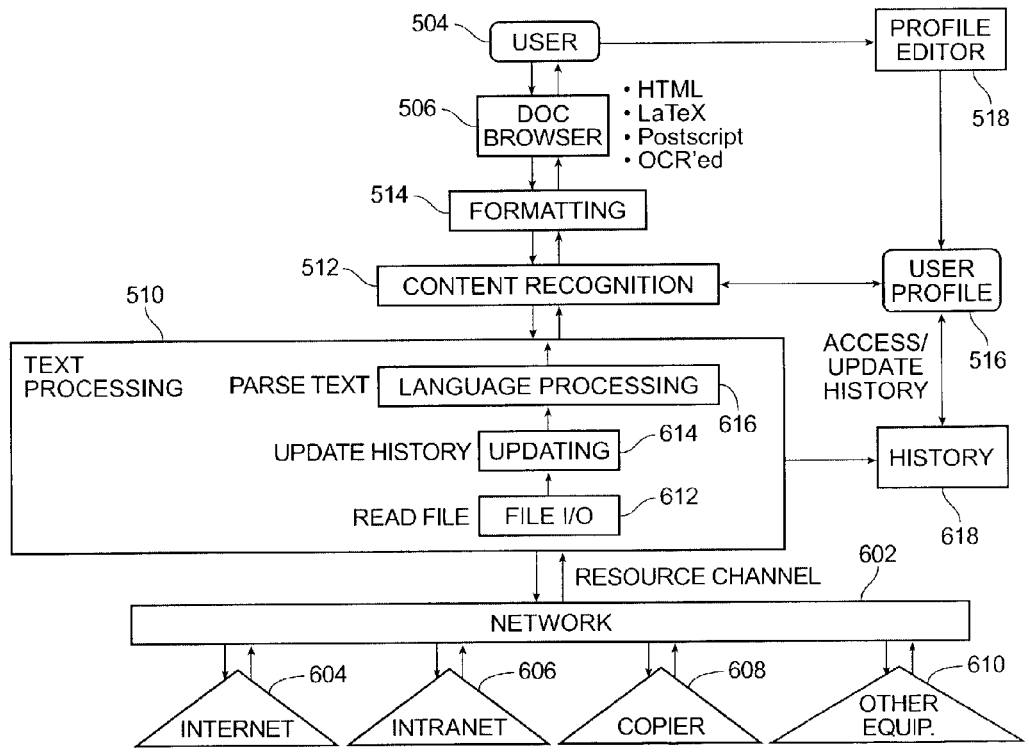
FIGS. 6A-6C depict a detailed software architectural diagram for automatic annotation in accordance with one embodiment of the present invention.

FIG. 6A depicts the automatic annotation software architecture of FIG. 5 with text processing stage 510 shown in greater detail. FIG. 6A shows that the source of document 502 may be accessed via a network 602. Possible sources include e.g., the Internet 604, an intranet 606, a digital copier 608 that captures document images, or other office equipment 610 such as a fax machine, scanner, printer, etc. Another alternative source is the user's own hard drive 32.

Text processing stage 510 includes a file I/O stage 612, an updating stage 614, and a language processing stage 616. File I/O stage reads the document file from network 602. Updating stage 614 maintains a history of recently visited documents in a history file 618. Language processing stage 616 parses the text of document 502 to generate the parsed text output of text processing stage 510.

Figure 6B:
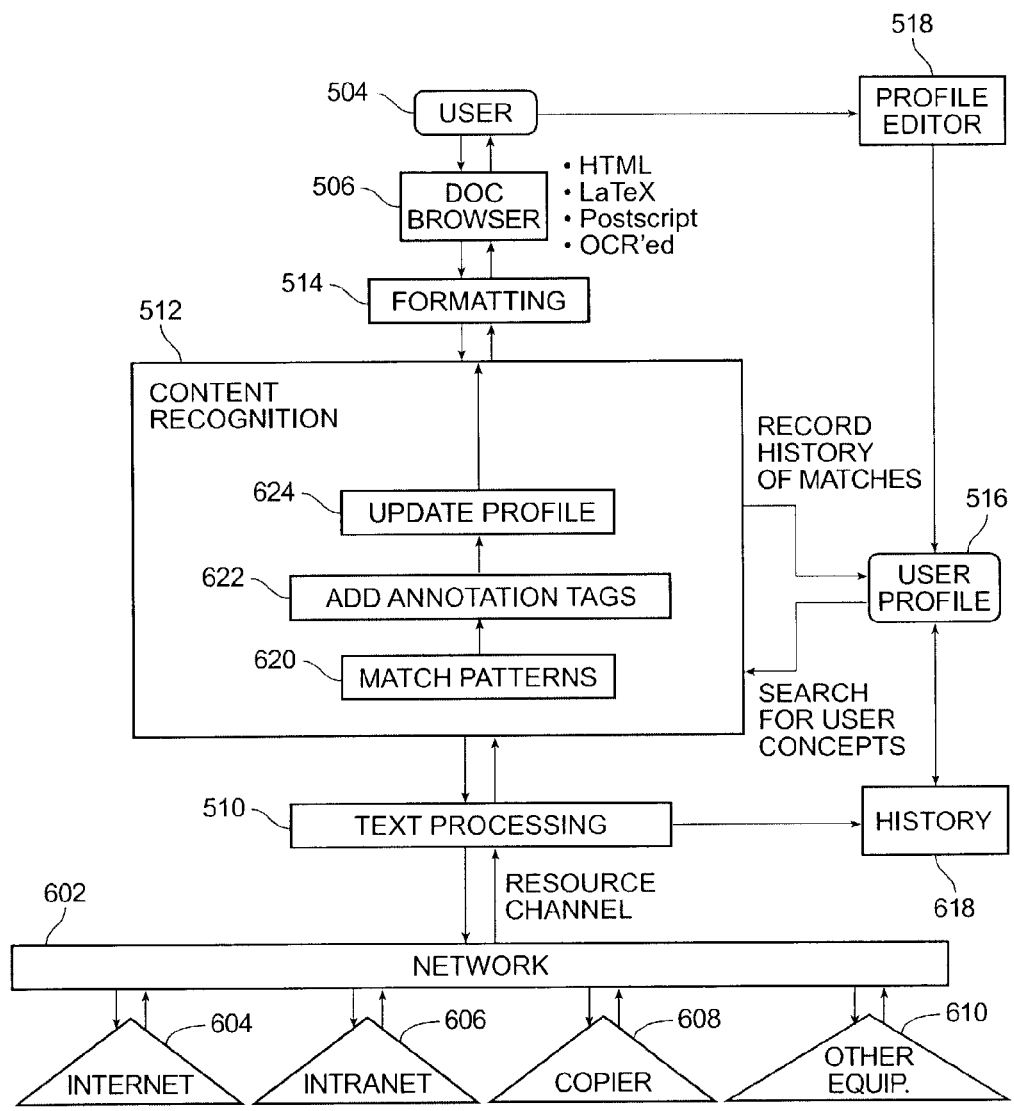

FIG. 6B depicts the automatic annotation software architecture of FIG. 5 with content recognition stage 512 shown in greater detail. A pattern identification stage 620 looks for particular patterns in the parsed text output of text processing stage 510. The particular patterns searched for are determined by the contents of user profile file 516. Once the patterns are found, annotation tags are added to the parsed text by an annotation tag addition stage 622 to indicate the pattern locations. In a preferred HTML embodiment, these annotation tags are compatible with the HTML format. However, the tagging process may be adapted to LaTeX, Postscript, etc. A profile updating stage 624 monitors the output of annotation tag addition stage 622 and analyzes text surrounding the locations of concepts of interest. As will be further discussed with reference to FIG. 7, profile updating stage 624 changes the contents of user profile file 516 based on the analysis of this surrounding text. The effect is to automatically refine the patterns searched for by pattern identification stage 620 to improve annotation performance.

Figure 6C:
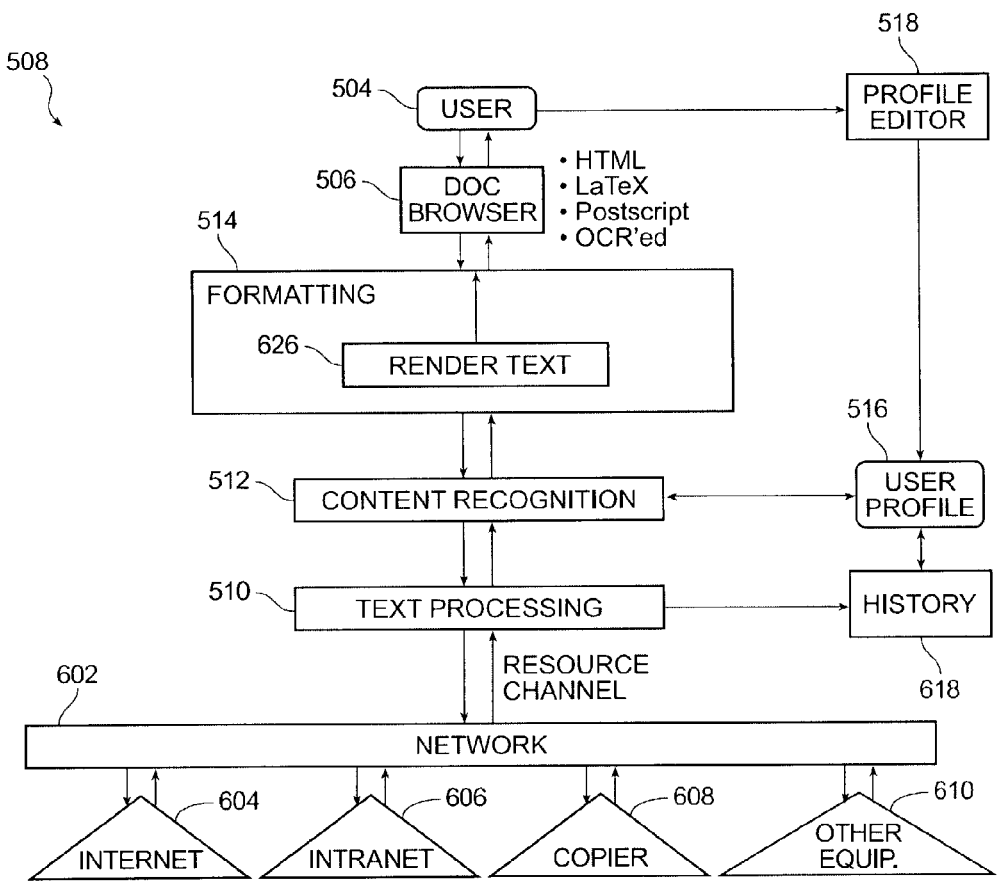

FIG. 6C depicts the automatic annotation software architecture of FIG. 5 with formatting stage 514 shown in greater detail. Formatting stage 514 includes a text rendering stage 626 that formats the annotated text provided by content recognition stage 512 to facilitate viewing by document browser 506. An HTML document as modified by formatting stage 514 is discussed in greater detail with reference to FIG. 10.

Pattern identification stage 620 looks for keywords and key phrases of interest and locates relevant discussion of concepts based on the located keywords. The identification of keywords and the application of the keywords to locating relevant discussion is preferably accomplished by reference to a belief system. The belief system is preferably a Bayesian belief network.

Figure 7:
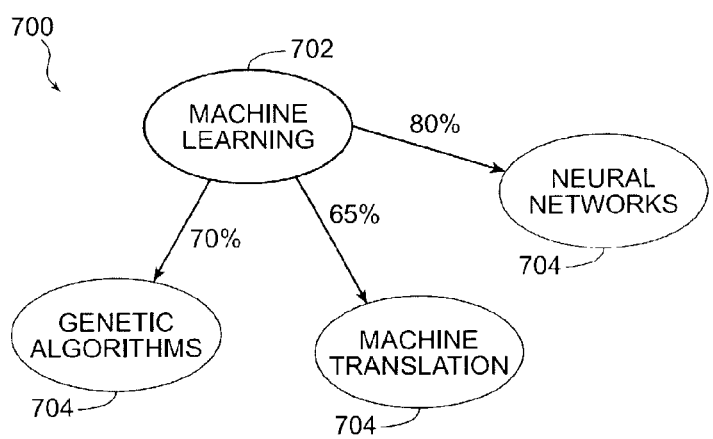
FIG. 7 depicts a representative Bayesian belief network useful in automatic annotation in accordance with one embodiment of the present invention.

FIG. 7 depicts a portion of a representative Bayesian belief network 700 implementing a belief system as used by pattern identification stage 622. A first oval 702 represents a particular user-specified concept of interest. Other ovals 704 represent subconcepts related to the concept identified by oval 702. Each line between one of subconcept ovals 704 and concept oval 702 indicates that discussion of the subconcept implies discussion of the concept. Each connection between one of subconcept ovals 704 and concept oval 702 has an associated probability value indicated in percent. These values in turn indicate the probability that the concept is discussed given the presence of evidence indicating the presence of the subconcept. Discussion of the subconcept is in turn indicated by one or more keywords or key phrases (not shown in FIG. 7).

The structure of Bayesian belief network 700 is only one possible structure applicable to the present invention. For example, one could employ a Bayesian belief network with more than two levels of hierarchy so that the presence of subconcepts is suggested by the presence of "subsubconcepts" and so on. In the preferred embodiment, presence of a keyword or key phrase always indicates presence of discussion of the subconcept but it is also possible to configure the belief network so that presence of a keyword or key phrase suggests discussion of the subconcept with a specified probability.

The primary source for the structure of Bayesian belief network 700 including the selection of concepts, keywords and key phrases, interconnections, and probabilities is user profile file 516. In a preferred embodiment, user profile file 516 is selectable for both editing and use from among profiles for many users.

The structure of belief system 700 is however also modifiable during use of the annotation system. The modifications may occur automatically in the background or may involve explicit user feedback input. The locations of concepts of interest determined by pattern identification stage 620 are monitored by profile updating stage 624. Profile updating stage 624 notes the proximity of other keywords and key phrases within each analyzed document to the locations of concepts of interest. If particular keywords and key phrases are always near a concept of interest, the structure and contents of belief system 700 are updated in the background without user input by profile updating stage 624. This could mean changing probability values, introducing a new connection between a subconcept and concept, or introducing a new keyword or key phrase.

User 504 may select a word or phrase in document 502 as being relevant to a particular concept even though the word or phrase has not yet defined to be a keyword or key phrase. Belief system 700 is then updated to include the new keyword or key phrase User 504 may also give feedback for an existing key word or key phrase, indicating the perceived relevance of the key-word or key phrase to the concept of interest. If the selected keyword or key phrase is indicated to be of high relevance to the concept of interest, the probability values connecting the subconcept indicated by the selected keywords or key phrases to the concept of interest increases. If, on the other hand, user 504 indicates the selected keywords or key phrases to be of little interest, the probability values connecting these keywords or key phrases to the concept decrease.

User Profile and Feedback Interfaces

Figure 8:
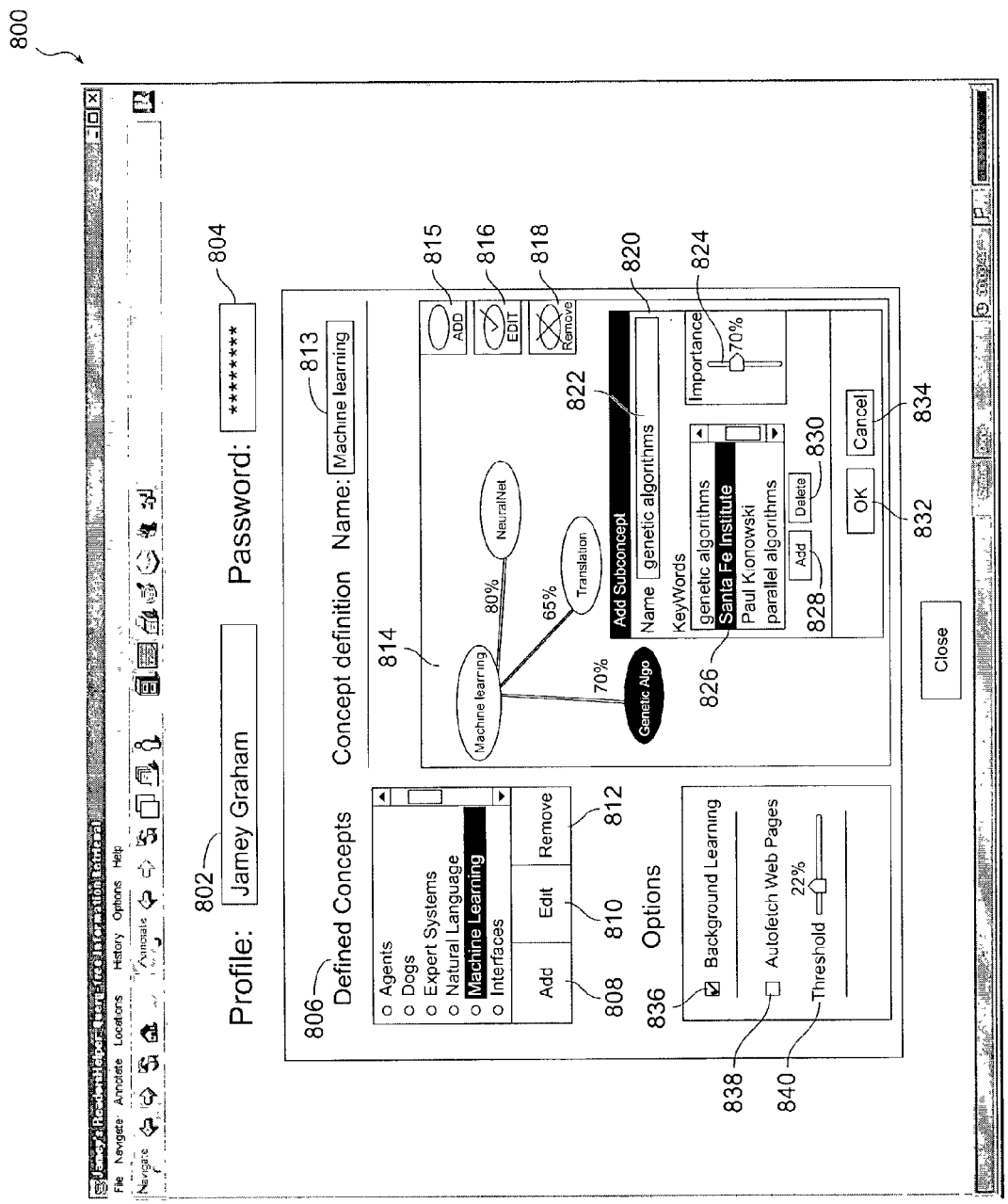
FIG. 8 depicts a user interface for defining a user profile in accordance with one embodiment of the present invention.

FIG. 8 depicts a user interface for defining a user profile in accordance with one embodiment of the present invention. User interface screen 800 is provided by profile editor 518. A profile name box 802 permits the user to enter the name of the person or group to whom the profile to be edited is assigned. This permits the annotation system according to the present invention to be personalized to particular users or groups. A password box 804 provides security by requiring entry of a correct password prior to profile editing operations.

A defined concepts list 806 lists all of the concepts which have already been added to the user profile. By selecting a concept add button 808, the user may add a new concept. By selecting a concept edit button 810, the user may modify the belief network as it pertains to the listed concept that is currently selected. By selecting a remove button 812, the user may delete a concept.

If a concept has been selected for editing, its name appears in a concept name box 813. The portion of the belief network pertaining to the selected concept is shown in a belief network display window 814. Belief network display window 814 shows the selected concept, the subconcepts which have been defined as relating to the selected concept and the percentage values associated with each relationship. The user may add a subconcept by selecting a subconcept add button 815. The user may edit a subconcept by selecting the subconcept in belief network display window 814 and then selecting a subconcept edit button 816. A subconcept remove button 818 permits the user to delete a subconcept from the belief network.

Selecting subconcept add button 815 causes a subconcept add window 820 to appear. Subconcept add window 820 includes a subconcept name box 822 for entering the name of a new subconcept. A slider control 824 permits the user to select the percentage value that defines the probability of the selected concept appearing given that the newly selected subconcept appears. A keyword list 826 lists the keywords and key phrases which indicate discussion of the subconcept. The user adds to the list by selecting a keyword add button 828 which causes display of a dialog box (not shown) for entering the new keyword or key phrase. The user deletes a keyword or key phrase by selecting it and then selecting a keyword delete button 830. Once the user has finished defining the new subconcept, he or she confirms the definition by selecting an OK button 832. Selection of a cancel button 834 dismisses subconcept add window 820 without affecting the belief network contents or structure. Selection of subconcept edit button 816 causes display of a window similar to subconcept add window 820 permitting redefinition of the selected subconcept.

By selecting whether a background learning checkbox 836 has been selected, the user may enable or disable the operation of profile updating stage 624. A web autofetch check box 838 permits the user to select whether or not to enable an automatic web search process. When this web search process is enabled, whenever a particular keyword or key phrase is found frequently near where a defined concept is determined to be discussed, a web search tool such as AltaVista™ is employed to look on the World Wide Web for documents containing the keyword or key phrase. A threshold slider control 840 is provided to enable the user to set a threshold relevance level for this autofetching process.

Figure 9A:
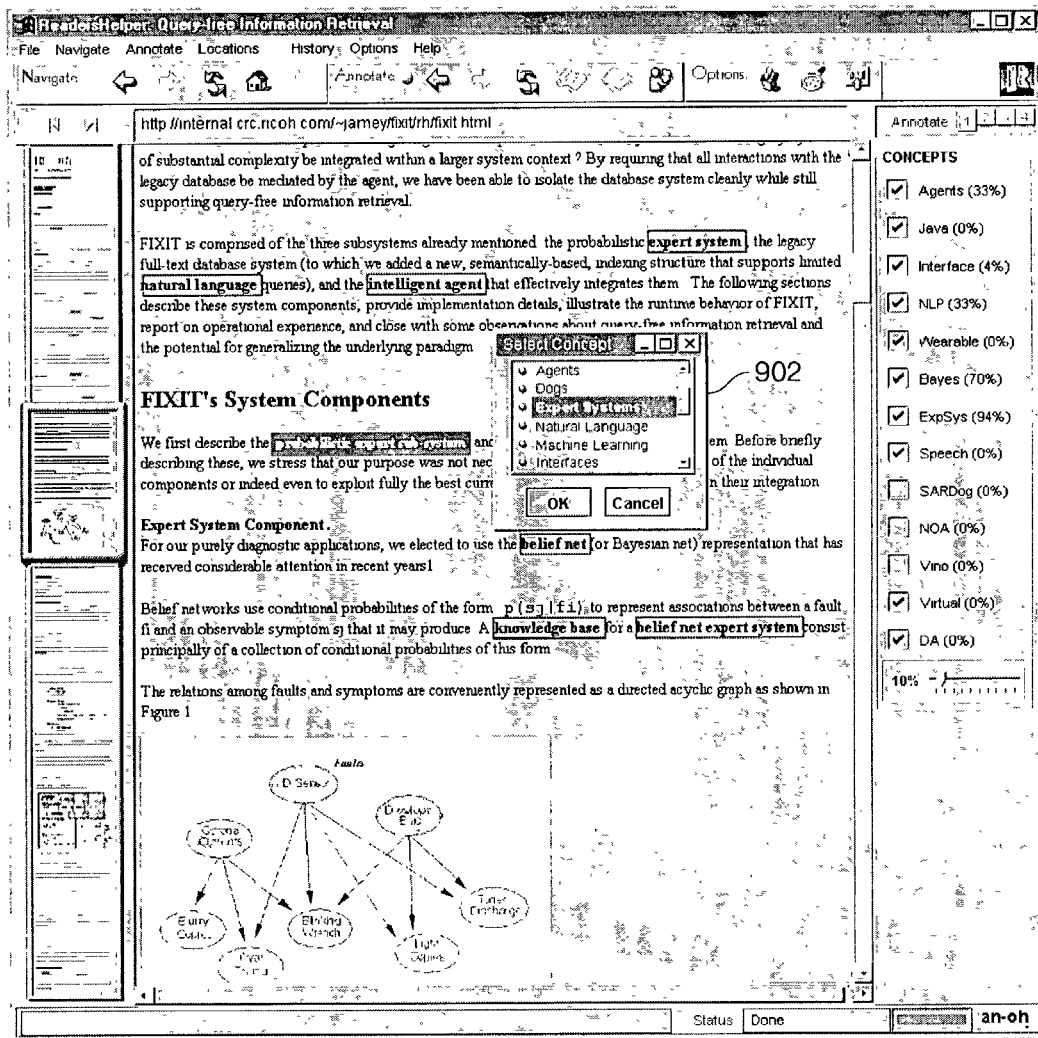
FIGS. 9A-9B depict an interface for providing user feedback in accordance with one embodiment of the present invention.
Figure 9B:
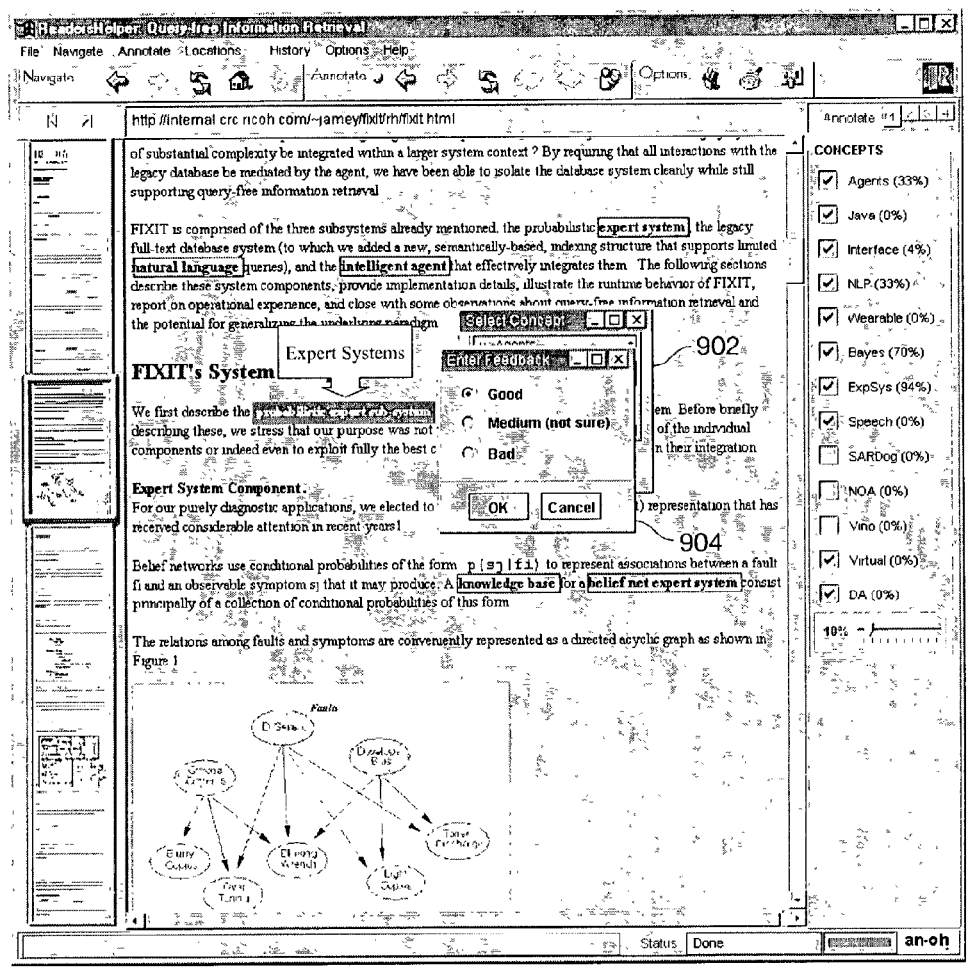

FIGS. 9A-9B depict a user interface for providing feedback in accordance with one embodiment of the present invention. User 502 may select any text and call up a first feedback window 902. The text may or may not have been previously identified by the annotation system as relevant. In first feedback window 902 shown in FIG. 9A, user 504 may indicate the concept to which the selected text is relevant. First feedback window 902 may not be necessary when adjusting the relevance level for a keyword or key phrase that is already a part of belief network 700. After the user selects a concept in first feedback window 902, a second feedback window 904 is displayed for selecting the degree of relevance. Second feedback window 904 in FIG. 9B provides three choices for level of relevance: good, medium (not sure), and bad. Alternatively, a slider control could be used to set the level of relevance. If the selected text is not already a keyword or key phrase in belief network 700, a new subconcept is added along with the associated new keyword or key phrase. If the selected text is already a keyword or key phrase, above, probability values within belief system 700 are modified appropriately in response to this user feedback.

FIG. 10 depicts a portion of an HTML document 1000 processed in accordance with one embodiment of the present invention. A sentence including relevant text is preceded by an a <RH.ANOH.S . . . > tag 1002 and followed by an </RH.ANOH.S > tag 1004. The use of these tags facilitates the annotation mode where complete sentences are highlighted. The <RH.ANOH.S . . . > tag 1002 includes a number indicating which relevant sentence is tagged in order of appearance in the document. Relevant text within a so-tagged relevant sentence is preceded by an <RH. ANOH . . . > tag 1006 and followed by an </RH.ANOH> tag 1008. The <RH.ANOH . . . > 1006 tag include the names of the concept and subconcept to which the annotated text is relevant, an identifier indicating which relevant sentence the text is in and a number which identifies which annotation this is in sequence for a particular concept. An HTML browser that has not been modified to interpret the special annotation tags provided by the present invention will ignore them and display the document without annotations.

Thumbnail Image Display

Referring again to FIGS. 2A-2D, an elongated thumbnail image 214 of many pages, or all of document 502 is presented in second viewing area 215. Document 502 will typically be a multi-page document with a section being displayed in first viewing area 202. Elongated thumbnail image 214 provides a convenient view of the basic document structure. The annotations incorporated into the document are visible within elongated thumbnail image 214. Within elongated thumbnail image 214, an emphasized area 214A shows a reduced view of the document section currently displayed in first viewing area 215 with the reduction ratio preferably being user-configurable. Thus, if the first viewing area 202 changes in size because of a change of window size, emphasized area 214A will also change in size accordingly. The greater the viewing area allocated to elongated thumbnail image 214 and emphasized area 214A, the more detail is visible. With very small allocated viewing areas, only sections of the document may be distinguishable. As the allocated area increases, individual lines and eventually individual words become distinguishable. In FIGS. 2A-2D the user-configured ratio is approximately 5:1. Emphasized viewing area 214 may be understood to be a lens or a viewing window over the part of elongated thumbnail image 214A corresponded to the document section displayed in first viewing area 215. User 504 may scroll through document 502 by sliding emphasized area 214A up and down. As emphasized area 214A shifts, the section of document 502 displayed in first viewing area 202 will also shift.

In FIGS. 2A-2C elongated thumbnail image 214 displays each page of document 502 as being displayed at the same reduced scale. The present invention also contemplates other modes of scaling elongated thumbnail image 214. For example, one may display emphasized area 214A at a scale similar to that shown in FIGS. 2A-2C and use a variable scale for the rest of elongated thumbnail image 214. Text from far away emphasized area 214A would be displayed at a highly reduced scale and the degree of magnification would increase with nearness to emphasized area 214A.

Because, the annotations appear in enlongated thumbnail image 214, it is very easy to find relevant text anywhere in document 502. Furthermore, elongated thumbnail image 214 provides a highly useful way of keeping track of one's position within a lengthy document.

Software Implementation

In a preferred embodiment, software to implement the present invention is written in the Java language. Preferably, the software forms a part of a stand-alone browser program written in the Java language. Alternatively, the code may be in the form of a so-called "plug-in" operating with a Java-equipped web browser used to browse HTML documents including the special annotation tags explained above.

In the foregoing specification, the invention has been described with reference to specific exemplary embodiments thereof. For example, any probabilistic inference method may be substituted for a Bayesian belief network. It will, however, be evident that various modifications and changes may be made thereunto without departing from the broader spirit and scope of the invention as set forth in the appended claims and their full scope of equivalents.

What is claimed is:

1. A computer-implemented method for displaying an electronically stored document comprising:
   receiving user input identifying one or more concepts from a plurality of concepts;
   displaying the document including visually emphasizing locations in the document that are relevant to the one or more concepts, the visually emphasized locations corresponding to locations of one or more keywords located in the document, the one or more keywords associated with the one or more concepts and identified from a plurality of keywords stored for the plurality of concepts, wherein presence of a keyword from the one or more keywords in the document implies discussion of a concept with which the keyword is associated; and
   displaying a relevance indicator for each concept in the one or more concepts, the relevance indicator for each concept indicating a degree of relevance of the document to the concept.

2. The method of claim 1 wherein displaying the document comprises highlighting sections of the document surrounding the locations that are relevant to the one or more concepts.

3. The method of claim 1 wherein displaying the document comprises displaying a balloon pointing to a user-selected one of the locations that are relevant to the one or more concepts, the balloon identifying a concept from the one or more concepts to which text in the user-selected one of the locations is relevant.

4. The method of claim 1 wherein displaying the document comprises displaying marginal notations identifying the locations that are relevant to the one or more concepts.

5. A computer-implemented method for annotating an electronically stored document comprising:
   storing first information identifying a plurality of concepts and one or more keywords associated with each concept in the plurality of concepts;
   receiving information identifying one or more concepts from the plurality of concepts;
   identifying, from the first information, one or more keywords associated with each concept in the one or more concepts, wherein presence of a keyword from the one or more keywords in the document implies discussion of a concept with which the keyword is associated;
   searching the electronic document to identify locations in the electronic document of the one or more keywords;
   visually emphasizing the locations of the one or more keywords in the electronic document; and
   determining a relevance value for each concept in the one or more concepts, the relevance value for each concept indicating relevance of the electronic document to the concept.

6. The method of claim 5 wherein searching the electronic document comprises using a probabilistic inference method to identify the locations in the electronic document of the one or more keywords.

7. The method of claim 6 wherein the probabilistic inference method comprises a Bayesian belief network.

8. The method of claim 7 further comprising:
   accepting user input defining a structure of the Bayesian belief network.

9. The method of claim 8 further comprising modifying the Bayesian belief network in accordance with content of previously annotated electronic documents.

10. The method of claim 7 further comprising:
    accepting user input indicating a degree of relation between the locations and the concepts in the one or more concepts; and
    modifying the Bayesian belief network responsive to the user input indicating the degree of relation.

11. A computer-implemented method for displaying an electronically stored document comprising:
    receiving user input identifying one or more concepts from a plurality of concepts;
    identifying one or more keywords associated with each concept in the one or more concepts, wherein presence of a keyword from the one or more keywords in the document implies discussion of a concept with which the keyword is associated;
    searching the document to identify locations of the keywords associated with concepts in the one or more concepts in the document;
    displaying the document, wherein the identified locations are visually emphasized; and
    displaying a relevance indicator for each concept in the one or more concepts, the relevance indicator for a concept indicating relevance of the document to the concept.

12. The method of claim 11 wherein displaying the document comprises highlighting sections of the document surrounding the identified locations.

13. The method of claim 11 wherein displaying the document comprises displaying a balloon pointing to a user-selected one of the identified locations, the balloon identifying a concept from the one or more concepts to which text in the user-selected one of the locations is relevant.

14. The method of claim 11 wherein displaying the document comprises displaying marginal notations identifying the locations of the keywords.

15. A computer system comprising:
    a processor; and
    a memory configured to store a plurality of code modules for execution by the processor, the plurality of code modules comprising:
    a code module for receiving user input identifying one or more concepts from a plurality of concepts;
    a code module for displaying the document including visually emphasizing locations in the document that are relevant to the one or more concepts, the visually emphasized locations corresponding to locations of one or more keywords located in the document, the one or more keywords associated with the one or more concepts and identified from a plurality of keywords stored for the plurality of concepts, wherein presence of a keyword from the one or more keywords in the document implies discussion of a concept with which the keyword is associated; and a code module for displaying a relevance indicator for each concept in the one or more concepts, the relevance indicator for each concept indicating a degree of relevance of the document to the concept.

16. The system of claim 15 wherein the code module for displaying the document comprises a code module for highlighting sections of the document surrounding the locations that are relevant to the one or more concepts.

17. The system of claim 15 wherein the code module for displaying the document comprises a code module for displaying a balloon pointing to a user-selected one of the locations that are relevant to the one or more concepts, the balloon identifying a concept from the one or more concepts to which text in the user-selected one of the locations is relevant.

18. The system of claim 15 wherein the code module for displaying the document comprises a code module for displaying marginal notations identifying the locations that are relevant to the one or more concepts.

19. A computer system comprising:

a processor; and a memory configured to store a plurality of code modules for execution by the processor, the memory configured to store first information identifying a plurality of concepts and one or more keywords associated with each concept in the plurality of concepts, the plurality of code modules comprising:

a code module for receiving information identifying one or more concepts from the plurality of concepts;

a code module for identifying, from the first information, one or more keywords associated with each concept in the one or more concepts, wherein presence of a keyword from the one or more keywords in the document implies discussion of a concept with which the keyword is associated;

a code module for searching the electronic document to identify locations in the electronic document of the one or more keywords;

a code module for emphasizing the locations of the one or more keywords in the electronic document; and a code module for determining a relevance value for each concept in the one or more concepts, the relevance value for each concept indicating relevance of the electronic document to the concept.

20. The system of claim 19 wherein the code module for searching the electronic document comprises a code module for using a probabilistic inference method to identify the locations in the electronic document of the one or more keywords.

21. The system of claim 20 wherein the probabilistic inference method comprises a Bayesian belief network.

22. The system of claim 21 wherein the plurality of code modules further comprises a code module for accepting user input defining a structure of the Bayesian belief network.

23. The system of claim 22 wherein the plurality of code modules further comprises a code module for modifying the Bayesian belief network in accordance with content of previously annotated electronic documents.

24. The system of claim 21 wherein the plurality of code modules further comprises:

a code module for accepting user input indicating a degree of relation between the locations and the concepts in the one or more concepts; and a code module for modifying the Bayesian belief network responsive to the user input indicating the degree of relation.

25. A data processing system comprising:

a processor; and a memory configured to store a plurality of code modules for execution by the processor, the plurality of code modules comprising:

a code module for receiving user input identifying one or more concepts from a plurality of concepts;

a code module for identifying one or more keywords associated with each concept in the one or more concepts, wherein presence of a keyword from the one or more keywords in the document implies discussion of a concept with which the keyword is associated;

a code module for searching the document to identify locations of the keywords associated with concepts in the one or more concepts in the document;

a code module for displaying the document, wherein the identified locations are visually emphasized; and a code module for displaying a relevance indicator for each concept in the one or more concepts, the relevance indicator for a concept indicating relevance of the document to the concept.

26. The system of claim 25 wherein the code module for displaying the document comprises a code module for highlighting sections of the document surrounding the identified locations.

27. The system of claim 25 wherein the code module for displaying the document comprises a code module for displaying a balloon pointing to a user-selected one of the identified locations, the balloon identifying a concept from the one or more concepts to which text in the user-selected one of the locations is relevant.

28. The system of claim 25 wherein the code module for displaying the document comprises a code module for displaying marginal notations identifying the locations.

29. A computer program product stored on a computer-readable storage medium for displaying an electronically stored document, the computer program product comprising:

code for receiving user input identifying one or more concepts from a plurality of concepts;

code for displaying the document including visually emphasizing locations in the document that are relevant to the one or more concepts, the visually emphasized locations corresponding to locations of one or more keywords located in the document, the one or more keywords associated with the one or more concepts and identified from a plurality of keywords stored for the plurality of concepts, wherein presence of a keyword from the one or more keywords in the document implies discussion of a concept with which the keyword is associated; and code for displaying a relevance indicator for each concept in the one or more concepts, the relevance indicator for each concept indicating a degree of relevance of the document to the concept.

30. A computer program product stored on a computer-readable storage medium for annotating an electronically stored document, the computer program product comprising:

code for storing first information identifying a plurality of concepts and one or more keywords associated with each concept in the plurality of concepts;

code for receiving information identifying one or more concepts from the plurality of concepts;

code for identifying, from the first information, one or more keywords associated with each concept in the one or more concepts, wherein presence of a keyword from the one or more keywords in the document implies discussion of a concept with which the keyword is associated;

code for searching the electronic document to identify locations in the electronic document of the one or more keywords;

code for visually emphasizing the locations of the one or more keywords in the electronic document; and code for determining a relevance value for each concept in the one or more concepts, the relevance value for each concept indicating relevance of the electronic document to the concept.

31. A computer program product stored on a computer-readable storage medium for displaying an electronically stored document, the computer program product comprising:

code for receiving user input identifying one or more concepts from a plurality of concepts;

code for identifying one or more keywords associated with each concept in the one or more concepts, wherein presence of a keyword from the one or more keywords in the document implies discussion of a concept with which the keyword is associated;

code for searching the document to identify locations of the keywords associated with concepts in the one or more concepts in the document;

code for displaying the document, wherein the identified locations are visually emphasized; and code for displaying a relevance indicator for each concept in the one or more concepts, the relevance indicator for a concept indicating relevance of the document to the concept.

* * * * *